United States Patent
Rock et al.

(10) Patent No.: US 10,601,063 B2
(45) Date of Patent: Mar. 24, 2020

(54) METHOD OF MANUFACTURING A FUEL CELL STACK

(71) Applicant: GM GLOBAL TECHNOLOGY OPERATIONS LLC, Detroit, MI (US)

(72) Inventors: Jeffrey A. Rock, Rochester Hills, MI (US); Liang Xi, Northville, MI (US); Yeh-Hung Lai, Oakland, MI (US); Xi Yang, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 225 days.

(21) Appl. No.: 15/475,734

(22) Filed: Mar. 31, 2017

(65) Prior Publication Data

US 2018/0287181 A1 Oct. 4, 2018

(51) Int. Cl.
*H01M 8/2404* (2016.01)
*G06F 17/50* (2006.01)
(Continued)

(52) U.S. Cl.
CPC ...... *H01M 8/2404* (2016.02); *G06F 17/5009* (2013.01); *H01M 8/0202* (2013.01); *H01M 8/0247* (2013.01); *H01M 8/0276* (2013.01); *G06F 2217/16* (2013.01); *H01M 8/242* (2013.01); *H01M 2008/1095* (2013.01); *Y02P 70/56* (2015.11)

(58) Field of Classification Search
CPC ............ G06F 17/5009; G06F 2217/16; H01M 2008/1095; H01M 8/0202; H01M 8/0247; H01M 8/0276; H01M 8/2404; H01M 8/242
See application file for complete search history.

(56) References Cited

U.S. PATENT DOCUMENTS

| 7,709,120 B2 | 5/2010 | Lai et al. |
| 2002/0056953 A1* | 5/2002 | Williams .......... B29C 45/14491 267/140.13 |

(Continued)

FOREIGN PATENT DOCUMENTS

| WO | WO-0209216 A2 * | 1/2002 | ............ H01M 8/247 |

OTHER PUBLICATIONS

WO 02/09216 A2 from patents.google.com (Year: 2002).*

*Primary Examiner* — Stewart A Fraser
*Assistant Examiner* — Victoria H Lynch
(74) *Attorney, Agent, or Firm* — Quinn IP Law

(57) ABSTRACT

A method of manufacturing a fuel cell stack includes compressing a stack of bipolar plates with a variable applied load a feature non-deformed displacement distance, which is measured from an initial height of the stack of bipolar plates. A first applied load at a first displacement distance and a second applied load at a second displacement distance are sensed. The first displacement distance and the second displacement distance are each less than the feature non-deformed displacement distance. A best fit curve, passing through the first applied load at the first displacement distance and the second applied load at the second displacement distance, is then determined. A final displacement distance, measured from the initial height, is calculated from the best fit curve for a target applied load. The stack of bipolar plates is then compressed to the final displacement distance measured from the initial height.

20 Claims, 3 Drawing Sheets

(51) Int. Cl.
_H01M 8/0247_ (2016.01)
_H01M 8/0276_ (2016.01)
_H01M 8/0202_ (2016.01)
_H01M 8/1018_ (2016.01)
_H01M 8/242_ (2016.01)

(56) References Cited

U.S. PATENT DOCUMENTS

| | | | |
|---|---|---|---|
| 2002/0110721 A1* | 8/2002 | Hatano | H01M 8/1004 429/434 |
| 2003/0049518 A1 | 3/2003 | Nanaumi et al. | |
| 2004/0224212 A1* | 11/2004 | Wakahoi | H01M 8/0271 429/482 |

* cited by examiner

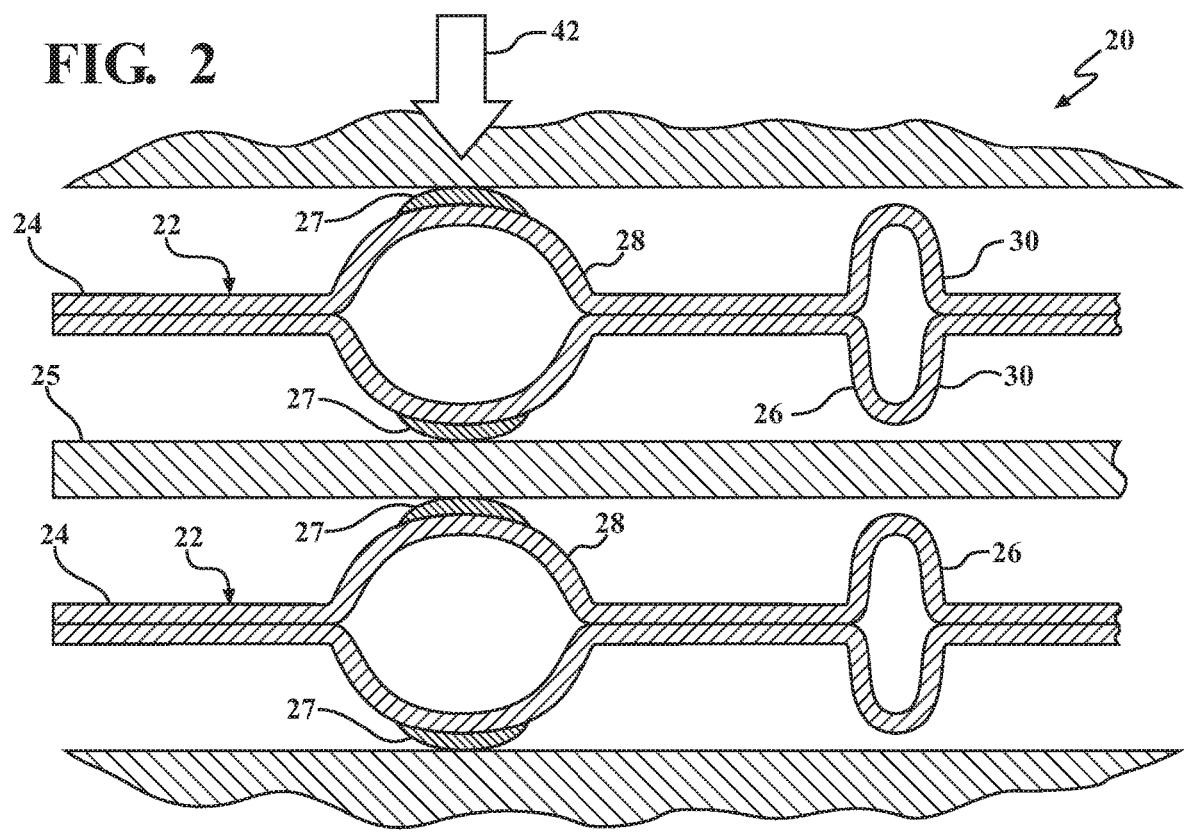
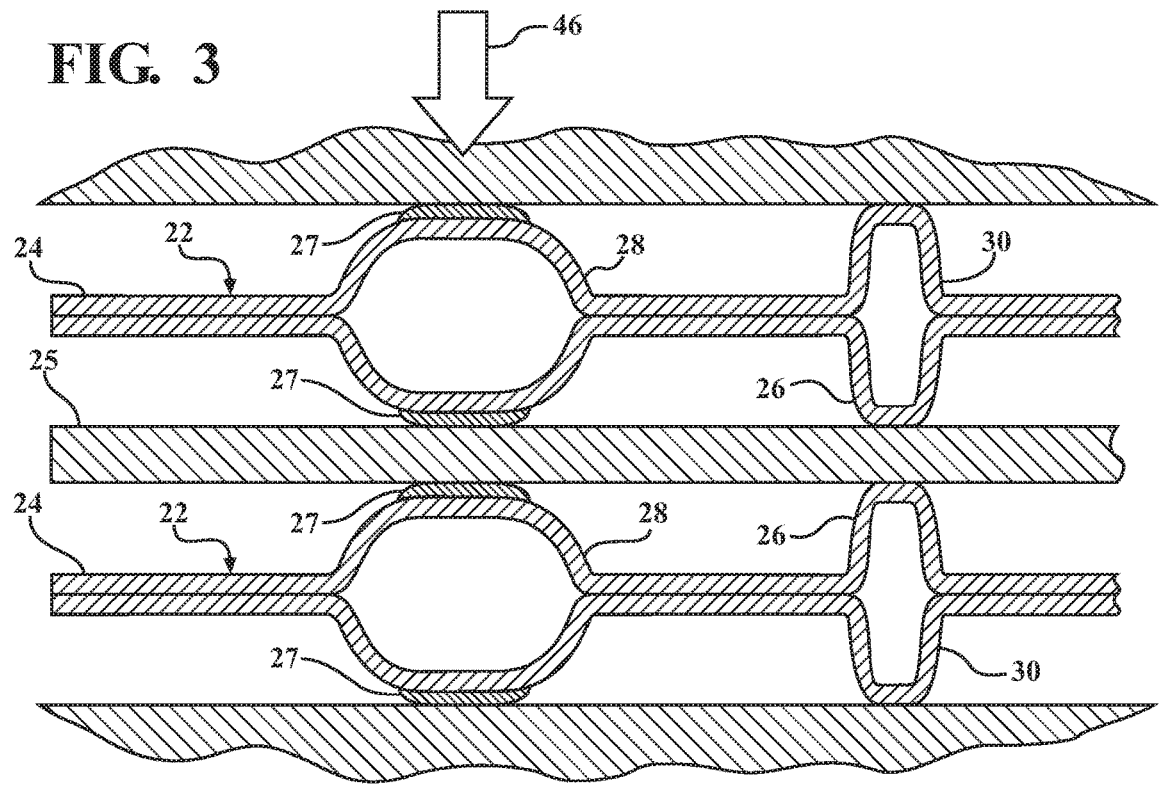

METHOD OF MANUFACTURING A FUEL CELL STACK

INTRODUCTION

The disclosure generally relates to a method of manufacturing a fuel cell stack.

Fuel cells are electrochemical devices which combine a fuel such as hydrogen and an oxidant such as oxygen to produce electricity. The term "fuel cell" is typically used to refer to either a single cell or a plurality of cells depending upon the context in which it is used. The plurality of cells is typically bundled together and arranged to form a stack with the plurality of cells commonly arranged in electrical series.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion mediums (hereinafter "DM's") or diffusion layers that are formed from a resilient, conductive, and gas permeable material such as carbon fabric or paper. The DM's serve as the primary current collectors for the anode and cathode as well as provide mechanical support for the MEA. The DM's and MEA are pressed between a pair of electronically conductive plates e.g., a monopolar plate or a bipolar plate, which serve as secondary current collectors for collecting the current from the primary current collectors.

Monopolar plates may include a single thin metal sheet, whereas the bipolar plates typically include two thin, facing metal sheets. The sheets define a flow path on one outer surface thereof for delivery of the fuel to the anode of the MEA, or the oxidant for delivery to the cathode side of the MEA. In the case of a bipolar plate, an outer surface of the other sheet defines a flow path for the other of the fuel to the anode of the MEA, or the oxidant for delivery to the cathode side of the MEA. In the case of bipolar plates, when the sheets are joined, the joined surfaces may define a flow path for a dielectric cooling fluid. The plates are typically produced from a formable metal that provides suitable strength, electrical conductivity, and corrosion resistance In order to mitigate against undesirable leakage of fluids from between the plates, a seal is often used. The seal is disposed along a peripheral edge of the plates, and/or around a periphery of any apertures extending through the plates. The seal may include an elastomeric seal, or alternatively, the metal plates may be formed to define a raised bead and be coated with a microseal to form a raised bead seal. The raised bead seal may be formed on a planar metal sheet adjacent an outer edge of the sheet, or adjacent an edge surrounding an aperture formed in the sheet. The raised bead seal may be formed in the metal sheet by a stamping operation, although other methods may be used. The raised bead seal may be substantially symmetrical about a longitudinal center line of the raised bead seal. However, it should be appreciated that the raised bead seal may be non-symmetrical about the longitudinal center line. The raised bead seal may include a generally arcuate cross sectional shape perpendicular to the longitudinal center line. The generally arcuate cross sectional shape of the raised bead seal provides an elastic response to a load in a direction normal to the planar metal sheet.

The raised bead seal is compressed and deformed against an adjoining plate to form a seal against the adjoining plate. If portions of the raised bead seal have a high stiffness, and others have a lower stiffness, the high stiffness areas of the raised bead seal may prevent the lower stiffness areas of the raised bead seal from forming a tight seal. Accordingly, the raised bead seals should have a uniform stiffness in all sections of the raised bead seal in order to form a tight seal around the entire peripheral edge of the plates and/or around the entire periphery of the adjacent aperture. Additionally, the raised bead seals should be compressed under a consistent, target applied load in order to achieve the desired sealing qualities.

Under extreme compressive loads, the raised bead seals may become over compressed and be in-elastically deformed into an undesirable shape. In order to limit over compression and reduce the possibility of in-elastic deformation of the raised bead seals, the bipolar plates may be equipped with a raised compression limiter(s). The raised compression limiter is a raised feature formed into the bipolar plates, such as a ridge, dimple, etc., which resists compression of the raised bead seals beyond a certain limit. However, engagement of the raised compression limiter during initial loading of the raised bead seal may affect the loading on the raised bead seal, and prevent the proper target compressive load from being applied to the raised bead seal during manufacture and compression of the fuel cell stack. Accordingly, when the bipolar plates are equipped with the raised compression limiters, it is important to ensure that the raised bead seals are loaded to the proper target applied load when compressing the fuel cell stacks.

SUMMARY

A method of manufacturing a fuel cell stack is provided. The method includes arranging a plurality of bipolar plates in an uncompressed stack. The uncompressed stack has an initial height. At least one of the bipolar plates includes a compressible feature. The stack of bipolar plates is compressed with a variable applied load to a feature non-deformed displacement distance, which is measured from the initial height of the stack of bipolar plates. A first applied load at a first displacement distance measured from the initial height is sensed. A second applied load at a second displacement distance measured from the initial height is also sensed. The first displacement distance and the second displacement distance are each less than the feature non-deformed displacement distance. A best fit curve, passing through the first applied load at the first displacement distance and the second applied load at the second displacement distance, is then determined. A final displacement distance, measured from the initial height, is calculated from the best fit curve for a target applied load. The stack of bipolar plates is then compressed to the final displacement distance measured from the initial height.

In one aspect of the disclosure, the compressible feature may include one of a raised bead seal, or a raised compression limiter.

In another aspect of the disclosure, the feature non-deformed displacement distance is the distance the stack of bipolar plates is compressed from the initial height, until the compressible feature is initially engaged by a bipolar plate and resists compression of the stack of bipolar plates. In another aspect of the disclosure, the target load is a desired compressive load applied to a seal area of the stack of bipolar plates, the seal area may include, but is not limited to, a raised bead seal of the bipolar plate.

In one embodiment, the method of manufacturing the fuel cell stack includes sensing a third applied load at a third displacement distance measured from the initial height. The best fit curve is defined to pass through the first applied load at the first displacement distance, the second applied load at the second displacement distance, and the third applied load at the third displacement distance.

In one embodiment of the method, the step of determining the best fit curve includes graphing a first point defined by the first applied load versus the first displacement distance, and a second point defined by the second applied load versus the second displacement distance. The first point and the second point are graphed on a Cartesian coordinate system representing applied load on a first axis against measured displacement from the initial height on a second axis. The best fit curve is drawn on the Cartesian coordinate system through the first point and the second point. The best fit curve is extended on the Cartesian coordinate system to an intersection with the target applied load. The final displacement distance is identified on the second axis of the Cartesian coordinate system, and is the location on the second axis that corresponds to the intersection of the best fit curve with the target applied load.

In another embodiment of the method, the step of determining the best fit curve includes defining an equation representing the best fit curve from a first point and a second point. The first point is defined by the first applied load versus the first displacement distance. The second point is defined by the second applied load versus the second displacement distance. The equation requires an applied load as an input and outputs a displacement distance from the initial height. Using the equation of the best fit curve, the final displacement distance for the target applied load may be calculated.

In another aspect of the disclosure, the method of manufacturing the fuel cell stack includes determining the feature non-deformed displacement distance.

In one embodiment of the method, the feature non-deformed displacement distance is determined by summing a maximum height of the compressible feature on each of the bipolar plates before any deformation of any of the compressible features of the bipolar plates occurs, to define an intermediate stack height. The intermediate stack height is then subtracted from the initial height to determining the feature non-deformed displacement distance.

In one embodiment of the method, the feature non-deformed displacement distance is determined by identifying a beginning of a sharp increase in a load to displacement ratio. The displacement from the initial height to the beginning of the sharp increase in the load to displacement ratio is defined as the feature non-deformed displacement distance.

Accordingly, by defining the best fit curve before compression of the compressible feature occurs, the amount of displacement (i.e., compression of the fuel cell stack) required to provide the target applied load to the seal areas of the bipolar plates may be determined. As such, the fuel cell stack is compressed to the final displacement distance, which approximately corresponds to the target applied load that should be applied to the seal areas of the bipolar plate, regardless of the amount of resistance to compression provided by compressible feature, such as but not limited to a raised compression limiter. Accordingly, the fuel cell stack is compressed to a final displacement distance from the initial height, regardless of the load required to achieve the final displacement distance, in order to ensure that the target applied load is applied to the seal areas of the bipolar plates.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 2 is a schematic cross sectional view of the fuel cell stack compressed from the initial height to a feature non-deformed displacement distance.

FIG. 3 is a schematic cross sectional view of the fuel cell stack compressed from the initial height to a final displacement distance.

DETAILED DESCRIPTION

Figure 1:
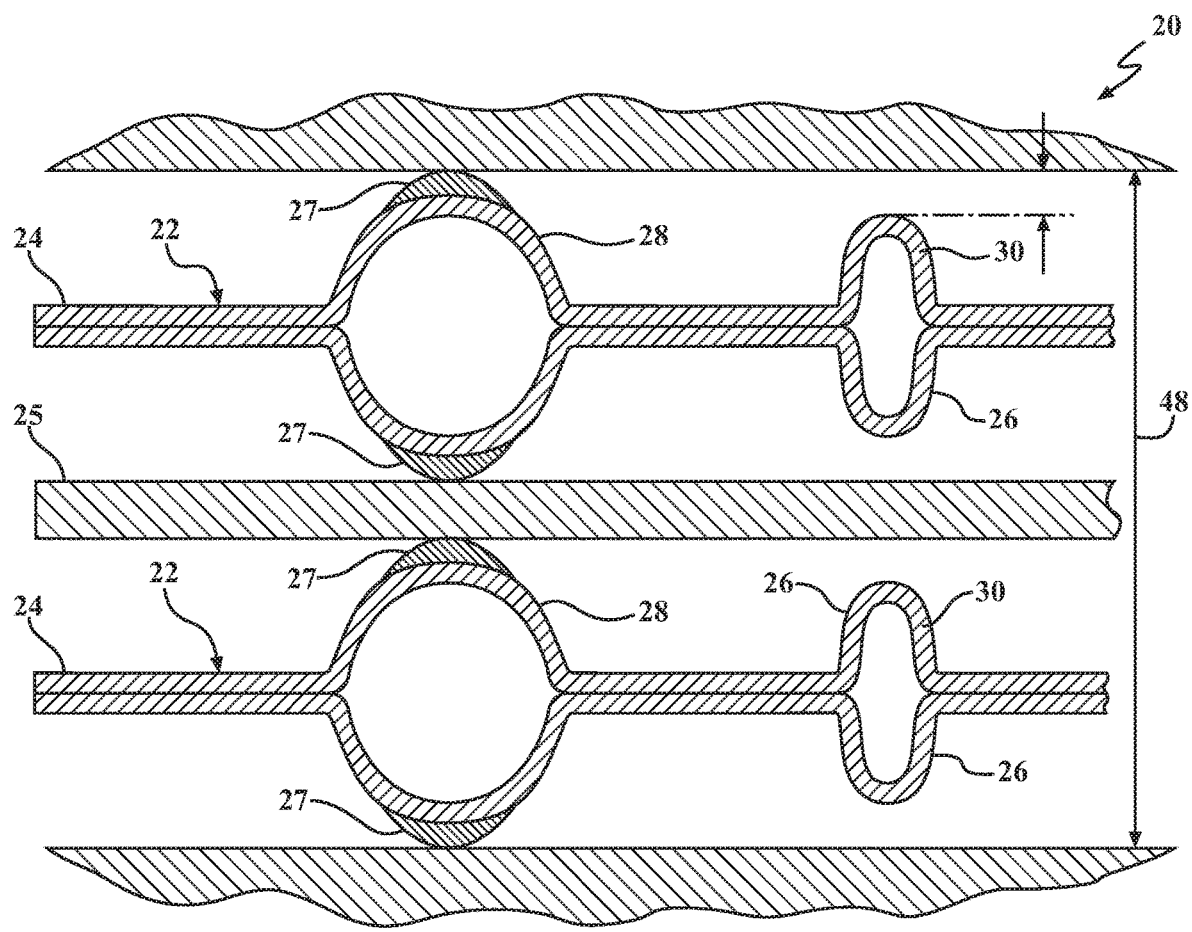
FIG. 1 is a schematic cross sectional view of a fuel cell stack in an uncompressed state having an initial height.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the FIGS., wherein like numerals indicate like parts throughout the several views, a fuel cell stack is generally shown at 20. The fuel cell stack 20 includes a plurality of individual fuel cells 22 stacked one on top of another. Each of the individual fuel cells 22 includes a bipolar plate 24. Each of the fuel cells 22 include many other components/layers that are not pertinent to the teachings of this disclosure. As such, the other layers and/or components of the fuel cells 22 are not shown in the Figures or described in detail herein. However, as a general description, these other layers may include, but are not limited to, a membrane, a membrane reinforcement, subgasket(s), adhesives, microseals, shorting protection, Diffusion Media (DM) with microporous layers, and shims. As shown in the Figures, the fuel cell stack 20 of the exemplary embodiment is shown with a subgasket 25 between an adjacent pair of bipolar plates 24.

At least one of the bipolar plates 24 may include a compressible feature 26. The compressible feature 26 may include any feature of the bipolar plates 24 that is intended to be elastically or in-elastically deformed during manufacture of the fuel cells 22 stack, but that may significantly resist compression of the fuel cell stack 20. The compressible feature 26 may include, but is not limited to, a raised bead seal 28 and/or a raised compression limiter 30. However, it should be appreciated that the compressible feature 26 may include some other feature than the exemplary raised bead seal 28 and/or raised compression limiter 30 described herein. The respective bipolar plates 24 of the exemplary embodiment shown in the Figures and described herein include a raised bead seal 28, which may extend around an outer periphery of the bipolar plate 24, and/or around an interior aperture extending through the respective bipolar plates 24. Additionally, the exemplary embodiment of the bipolar plates 24 shown in the Figures and described herein further include a raised compression limiter 30 disposed adjacent the raised bead seal 28. As shown in the Figures, each raised bead seal 28 of the fuel cell stack 20 of the exemplary embodiment is shown with a microseal 27 disposed on opposing surfaces of each respective raised bead seal.

Figure 4:
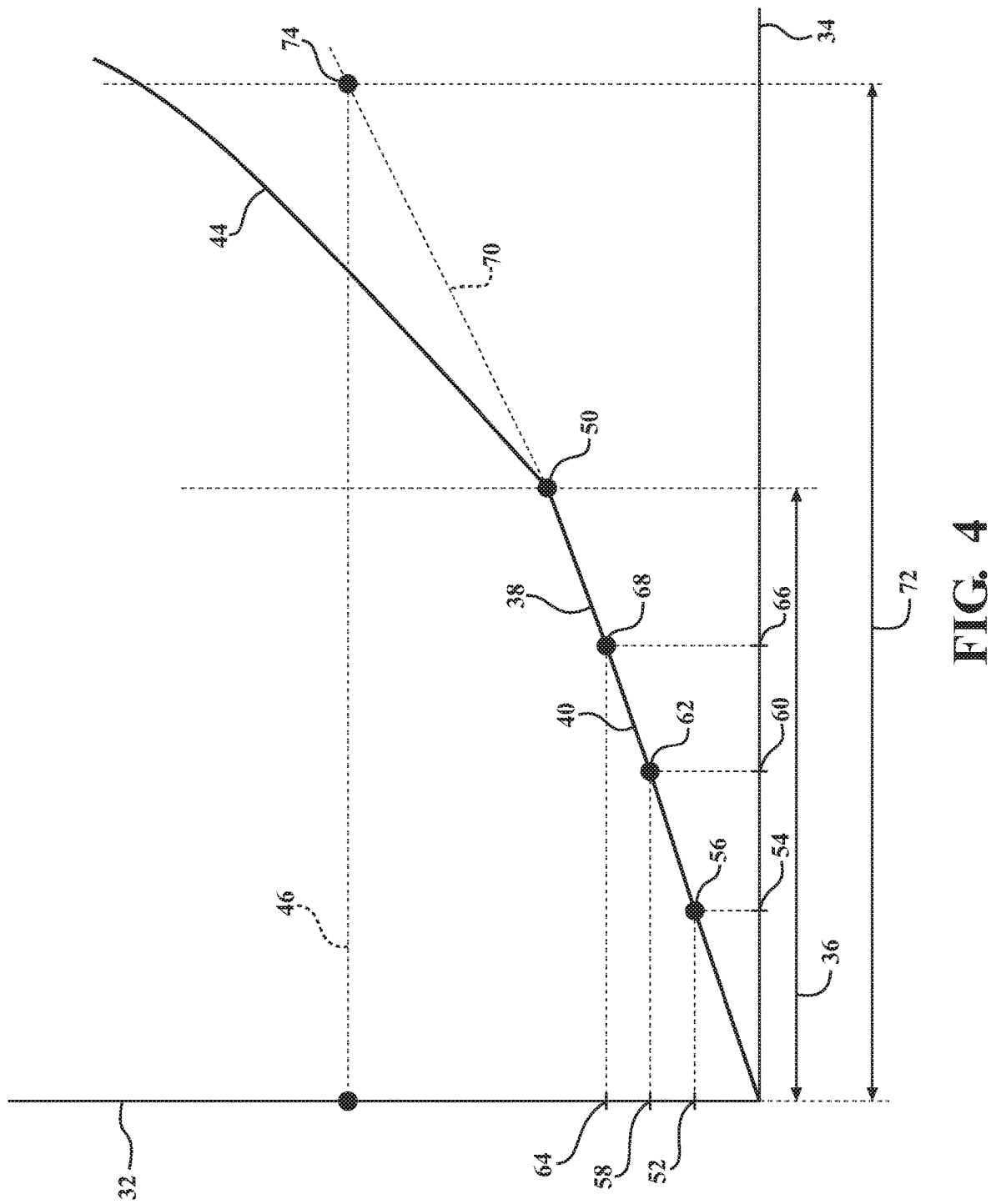
FIG. 4 is a graph representing applied load versus displacement (i.e., compression) of the fuel cell stack from an initial height.

During manufacture of the exemplary fuel cell stack 20 described herein, the bipolar plates 24 are compressed together to deform the raised bead seal 28 and apply a target load to the raised bead seal 28 to ensure proper sealing properties. FIG. 1 shows the fuel cell stack 20 in an initial, uncompressed state. As can be seen, the raised bead seals 28 are shown contacting each other, but are not yet deformed under compression. This initial, uncompressed state is generally represented by the origin in the graph of FIG. 4. FIG. 4 shows the applied load on a first axis 32, i.e., the y axis, and the displacement from the initial uncompressed state along a second axis 34, i.e., the x axis. During manufacture, the fuel cell stack 20 is compressed under an applied load. FIG. 2 shows the fuel cell stack 20 in an intermediate state of compression, with the raised bead seals 28 partially deformed, and the raised compression limiters 30 just coming into abutting contact with each other. The intermediate state of compression is generally shown in FIG. 4 by a line representing a feature non-deformed displacement distance 36.

The raised bead seals 28 are designed to provide a generally consistent increase in resistance to the applied load. The actual load applied to the fuel cell stack 20 during compression of the fuel cell stack 20 is generally indicated by line 38. The generally consistent increase in resistance to the applied load provided by the raised bead seals 28, between the initial uncompressed state and the intermediated state, is generally indicated by the slight slope of the line segment 40. The raised compression limiters 30, however, are designed to provide significant additional stiffness and/or resistance to the compression of the fuel cell stack 20 in order to prevent over deformation and/or inelastic deformation of the raised bead seals 28. Deformation of the raised compression limiters 30 requires a significantly greater applied load than compression of the raised bead seals 28 alone. The increase in the applied load to deform the raised compression limiters 30 is generally shown by the increased rate of change in the applied load to displacement, generally shown by line segment 44. The raised compression limiters 30, therefore, provide a significant resistance to compression by the applied force.

If a target applied load 46 for the raised bead seal 28 is greater than the applied load provided when the raised compression limiters 30 of the bipolar plates 24 contact each other, such as shown in FIG. 2 and by the feature non-deformed displacement distance 36 in FIG. 4, then the measure of the applied load is no longer indicative of the actual load applied to the raised bead seal 28. As such, the actual measured applied load cannot be used to determine the actual loading on the raised bead seals 28. The method described herein provides a process to achieve the proper applied target load to the raised bead seals 28, when the raised compression limiters 30 are providing resistance to compression of the fuel cell stack 20.

The method of manufacturing the fuel cell stack 20 includes arranging the plurality of individual fuel cells 22, including their respective bipolar plates 24, one on top of another, in an uncompressed stack having an initial height 48. The bipolar plate 24 of at least one of the fuel cells 22 includes a compressible feature 26. In the exemplary embodiment shown in the Figures and described herein, each of the bipolar plates 24 of each of the respective fuel cells 22 includes a compressible feature 26. In some embodiments, the compressible feature 26 may include the raised bead seal 28. In other embodiments, the compressible feature 26 may include the raised compression limiter 30. In other embodiments, the compressible feature 26 may include both the raised bead seal 28 and the raised compression limiter 30. In yet other embodiments, the compressible feature 26 may include some other feature not shown in the figures or described herein. While the exemplary embodiment described below refers to the raised compression limiter 30 as the compressible feature 26 that resists compression of the fuel cell stack 20, it should be appreciated that the compressible feature 26 may alternatively be defined as the raised bead seal 28, or some other feature not shown or described herein.

The feature non-deformed displacement distance 36 is determined or defined for the fuel cell stack 20. The feature non-deformed displacement distance 36 is the distance the stack of fuel cells 22, including the stack of bipolar plates 24, is compressed from the initial height 48 of the uncompressed stack of fuel cells 22 until the compressible feature 26 is initially engaged or contacted by the opposing fuel cell and/or bipolar late and begins to provide resistance against compression of the stack of fuel cells 22 and/or bipolar plates 24, such as shown in FIG. 2. In the exemplary embodiment shown in the figures and described herein, the feature non-deformed displacement distance 36 is the distance or amount of displacement from the initial height 48 of the fuel cell stack 20 until the raised compression limiters 30 come into abutting contact with each other.

The feature non-deformed displacement distance 36 may be determined in any suitable manner. For example, a maximum height of the compressible feature 26 on each of the bipolar plates 24 before any deformation of any of the compressible features 26 of the bipolar plates 24 may be summed together to define an intermediate stack height. The intermediate stack height may then be subtracted from the initial height 48 to determine the feature noncontact displacement distance 36. In the exemplary embodiment shown and described herein, the maximum height of the respective compressible features 26 may be considered the uncompressed or un-deformed height of the respective raised compression limiters 30 of each of the bipolar plates 24. It should be appreciated that the fuel cells 22 may include other layers and/or components, and that the thickness of those other layers and/or components and may be included in the initial height 48 of the fuel cell stack 20 as well. However, since the amount of compression or deformation of these other layers is significantly less than the compression and/or deformation in the raised bead seals 28 and/or raised compression limiters 30, for the purposes of the method described herein, their contribution to the initial height 48 of the fuel cell stack 20 is substantially equal to their contribution to a final height of the fuel cell stack 20, and therefor does not significantly affect the process described herein.

The feature non-deformed displacement distance 36 may be determined in other manners as well. For example, the feature non-deformed displacement distance 36 may be determined by identifying a beginning of a sharp increase in a load to displacement ratio. Referring to FIG. 4, this sharp increase is generally represented by point 50. The feature non-deformed displacement distance 36 is defined as the displacement from the initial height 48 to point 50, i.e., the beginning of the sharp increase in the load to displacement ratio.

Once the feature non-deformed displacement distance 36 has been defined, the stack of fuel cells 22 is compressed with a variable applied load 42. The stack of fuel cells 22 is compressed from the initial height 48, a distance equal to the feature non-deformed displacement distance 36. As noted above, FIG. 1 shows the fuel cell stack 20 in the uncompressed condition at the initial height 48. FIG. 2 shows the fuel cell stack 20 compressed to the feature non-deformed displacement distance 36. As can be seen in FIG. 4, the applied load increases gradually from the beginning of the compression of the fuel cell stack 20 near the initial height 48, to the feature non-deformed displacement distance 36, such as shown in FIG. 2. While FIG. 4 shows this gradual increase as a linear increase, it should be appreciated that this increase may be non-linear as well.

While the fuel cell stack 20 is being compressed the feature non-deformed displacement distance 36 from the initial height 48, a first applied load 52 at a first displacement distance 54 measured from the initial height 48, and a second applied load 58 at a second displacement distance 60 measured from the initial height 48 are measured. While at least two data points are sensed, i.e., a first data point 56 and a second data point 62, are sensed, with each data point including an applied load at a corresponding displacement distance, it should be appreciated that more than two data points may be sensed. Accordingly, a third applied load 64 at a third displacement distance 66 measured from the initial height 48 may also be sensed, thereby providing a third data point 68. The process may include any number of data points sensed during the compression of the fuel cell stack 20 the feature contact distance from the initial height 48. It should be appreciated that all of the sensed displacement distances, e.g., the first displacement distance 54, the second displacement distance 60, the third displacement distance 66, etc., are each less than the feature non-deformed displacement distance 36.

A best fit curve 70 is determined from at least the first applied load 52 at the first displacement distance 54 and the second applied load 58 at the second displacement distance 60. If more data points were sensed, then the best fit curve 70 may be determined from all of the data points. For example, if the third applied load 64 at the third displacement distance 66 was also sensed, then it may also be used to determine the best fit curve 70. The best fit curve 70 passes through or near each of the data points, i.e., the best fit curve 70 passes through or near the first applied load 52 at the first displacement distance 54, the second applied load 58 at the second displacement distance 60, and if sensed, the third applied load 64 at the third displacement distance 66. The best fit curve 70 may be linear, or may be non-linear. It should be appreciated that if only two data points are sensed, the best fit curve 70 will be linear and pass through the first data point 56, i.e., the first applied load 52 at the first displacement distance 54 and the second data point 62, i.e., the second applied load 58 at the second displacement distance 60. However, if more than two data points were sensed, then the best fit curve 70 may be linear or non-linear. A final displacement distance 72 measured from the initial height 48 may then be calculated from the best fit curve 70 for the target applied load 46. The target applied load 46 is a desired compressive load applied to a seal area of the stack of fuel cells 22 and/or bipolar plates 24. In the exemplary embodiment shown and described herein, the target applied load 46 is the desired loading on the raised bead seals 28 of the bipolar plates 24.

The best fit curve 70 may be determined in any suitable manner. For example, a computer program may be used to define the best fit curve 70 and/or formulate an equation representing the best for curve. For example, determining the best fit curve 70 may include graphing the first data point 56, defined by the first applied load 52 versus the first displacement distance 54, and the second data point 62, defined by the second applied load 58 versus the second displacement distance 60, on a Cartesian coordinate system representing applied load on one axis against measured displacement from the initial height 48 on a another axis. The best fit curve 70 on the Cartesian coordinate system may be drawn through the first data point 56 and the second data point 62. If more data points were sensed, then they may also be used to draw the best fit curve 70. Referring to FIG. 4, the best fit curve 70 is generally indicated by the dashed line 74.

The best fit curve 70 is extended to an intersection 74 with the target applied load 46 on the Cartesian coordinate system. As noted above, the target applied load 46 is the desired loading on the seal area of the bipolar plate 24. In the exemplary embodiment shown and described herein, the seal area is defined as the raised bead seals 28. Accordingly, the target applied load 46 is the desired loading applied to the raised bead seals 28 of the bipolar plates 24. The final displacement distance 72 may then be identified on the second axis 34 of the Cartesian coordinate system corresponding to the intersection 74 of the best fit curve 70 with the target applied load 46.

Alternatively, the best fit curve 70 may include defining an equation representing the best fit curve 70 from the first data point 56 defined by the first applied load 52 versus the first displacement distance 54, and the second point defined by the second applied load 58 versus the second displacement distance 60. If other data points were sensed, then they may also be used to define the equation representing the best fit curve 70. The equation may require, for example, an applied load as an input into the equation. The output from the equation would be the final placement distance measured from the initial height 48 of the fuel cell stack 20. The equation of the best fit curve 70 may then be used to calculate the final displacement distance 72 for the target applied load 46.

Once the final displacement distance 72 has been identified and/or calculated, the fuel cell stack 20 is further compressed into the final displacement distance 72, which is measured from the initial height 48. FIG. 3 shows the fuel cell stack 20 compressed to the final displacement distance 72. As noted above, once the fuel cell stack 20 is compressed beyond the feature non-deformed displacement distance 36, the actual applied load cannot be used to measure the loading on the raised bead seals 28, because the raised compression limiters 30 are providing significantly more resistance to the compressive loading than the raised bead seals 28. Accordingly, by extrapolating the best fit curve 70 from the data points obtained during the initial compression and/or deformation of the raised bead seals 28, prior to the raised compression limiters 30 providing any resistance to the applied load, then the final displacement distance 72 associated with the desired amount of loading on the raised bead seal 28 may be determined. By compressing the fuel cell stack 20 from the initial height 48 to the final displacement distance 72, the actual loading on the raised bead seals 28 may be approximated to equal the desired target applied load 46 on the raised bead seals 28. The process described herein enables the use of taller raised compression limiters 30, which ensures that the raised compression limiters 30 engage quicker to prevent inelastic deformation of the raised bead seals 28 in the event of an extreme loading.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of manufacturing a fuel cell stack, the method comprising:
   arranging a plurality of bipolar plates in an uncompressed stack having an initial height, wherein at least one of the plurality of bipolar plates includes a compressible feature and a raised compression limiter;
   compressing the stack of the plurality of bipolar plates with a variable applied load to a feature non-deformed displacement distance measured from the initial height;
   sensing a first applied load at a first displacement distance measured from the initial height, and a second applied load at a second displacement distance measured from the initial height, wherein the first displacement distance and the second displacement distance are each less than the feature non-deformed displacement distance;
   determining a best fit curve passing through the first applied load at the first displacement distance and the second applied load at the second displacement distance, wherein the best fit curve departs from an actual curve of an actual applied load to an actual displacement distance measured from the initial height;
   calculating a final displacement distance measured from the initial height based on the best fit curve, wherein the final displacement distance asserts a target applied load on the compressible feature and an additional load on the raised compression limiter; and
   compressing the stack of the plurality of bipolar plates to the final displacement distance measured from the initial height using a force matching a sum of the target applied load and the additional load.

2. The method set forth in claim 1, wherein the compressible feature is a raised bead seal.

3. The method set forth in claim 1, wherein the feature non-deformed displacement distance is a distance that the stack of the plurality of bipolar plates is compressed from the initial height until the raised compression limiter is engaged by an opposing bipolar plate and resists compression of the stack of the plurality of bipolar plates.

4. The method set forth in claim 1, further comprising sensing a third applied load at a third displacement distance measured from the initial height.

5. The method set forth in claim 4, wherein determining the best fit curve is further defined as determining the best fit curve that passes through the first applied load at the first displacement distance, the second applied load at the second displacement distance, and the third applied load at the third displacement distance.

6. The method set forth in claim 1, wherein the target applied load is a desired compressive load applied to a seal area of the stack of the plurality of bipolar plates in the absence of the raised compression limiter.

7. The method set forth in claim 1, wherein determining the best fit curve includes graphing a first point defined by the first applied load versus the first displacement distance, and a second point defined by the second applied load versus the second displacement distance, on a Cartesian coordinate system representing applied load on a first axis against measured displacement from the initial height on a second axis.

8. The method set forth in claim 7, further comprising drawing the best fit curve on the Cartesian coordinate system through the first point and the second point, and extending the best fit curve to an intersection with the target applied load on the Cartesian coordinate system.

9. The method set forth in claim 8, further comprising identifying the final displacement distance on the second axis of the Cartesian coordinate system corresponding to the intersection of the best fit curve with the target applied load.

10. The method set forth in claim 1, wherein determining the best fit curve includes defining an equation representing the best fit curve from a first point defined by the first applied load versus the first displacement distance, and a second point defined by the second applied load versus the second displacement distance, wherein the equation receives an applied load as an input and outputs a displacement distance from the initial height.

11. The method set forth in claim 10, further comprising using the equation of the best fit curve to calculate the final displacement distance for the target applied load.

12. The method set forth in claim 1, further comprising determining the feature non-deformed displacement distance.

13. The method set forth in claim 12, wherein determining the feature non-deformed displacement distance includes summing a maximum height of the compressible feature on each of the plurality of bipolar plates before any deformation of the raised compression limiter of the plurality of bipolar plates, to define an intermediate stack height.

14. The method set forth in claim 13, wherein determining the feature non-deformed displacement distance includes subtracting the intermediate stack height from the initial height to define the feature non-deformed displacement distance.

15. The method set forth in claim 12, wherein determining the feature non-deformed displacement distance includes identifying a beginning of a sharp increase in a load to displacement ratio, and defining the displacement from the initial height to the beginning of the sharp increase in the load to displacement ratio as the feature non-deformed displacement distance.

16. A method of manufacturing a fuel cell stack, the method comprising:
   arranging a plurality of fuel cells in an uncompressed stack having an initial height, wherein each of the plurality of fuel cells includes a bipolar plate having a raised bead seal and a raised compression limiter;
   determining a feature non-deformed displacement distance, wherein the feature non-deformed displacement distance is a distance that the stack of the plurality of fuel cells is compressed from the initial height until the raised compression limiter of the respective bipolar plates is engaged and begins to resist compression of the stack of the plurality of fuel cells;
   compressing the stack of the plurality of fuel cells, from the initial height with a variable applied load, to the feature non-deformed displacement distance;
   sensing a first applied load at a first displacement distance measured from the initial height, and a second applied load at a second displacement distance measured from the initial height, wherein the first displacement distance and the second displacement distance are each less than the feature non-deformed displacement distance;

determining a best fit curve passing through the first applied load at the first displacement distance and the second applied load at the second displacement distance, wherein the best fit curve departs from an actual curve of an actual applied load to an actual displacement distance measured from the initial height;

calculating a final displacement distance measured from the initial height based on the best fit curve, wherein the final displacement distance asserts a target applied load and an additional load on the raised compression limiter, and the target applied load is a desired compressive load applied to the raised bead seal of each respective bipolar plate; and compressing the stack of the plurality of fuel cells to the final displacement distance measured from the initial height using a force matching a sum of the target applied load and the additional load.

17. The method set forth in claim 16, wherein:

determining the best fit curve includes graphing a first point defined by the first applied load versus the first displacement distance, and a second point defined by the second applied load versus the second displacement distance, on a Cartesian coordinate system representing applied load on a first axis against measured displacement from the initial height on a second axis;

drawing a curve on the Cartesian coordinate system through the first point and the second point, and extending the curve to an intersection with the target applied load on the Cartesian coordinate system; and identifying the final displacement distance on the second axis of the Cartesian coordinate system corresponding to the intersection of the best fit curve with the target applied load.

18. The method set forth in claim 16, wherein:

determining the best fit curve includes defining an equation representing the best fit curve from a first point defined by the first applied load versus the first displacement distance, and a second point defined by the second applied load versus the second displacement distance, wherein the equation receives an applied load as an input and outputs a displacement distance from the initial height; and calculating the final displacement distance using the target applied load as the input for the equation representing the best fit curve.

19. The method set forth in claim 16, wherein determining the feature non-deformed displacement distance includes:

summing a height of the raised compression limiter of each of the respective bipolar plates prior to any deformation of the raised compression limiter of each of the respective bipolar plates to define an intermediate stack height; and subtracting the intermediate stack height from the initial height to define the feature non-deformed displacement distance.

20. The method set forth in claim 16, wherein determining the feature non-deformed displacement distance includes:

identifying a beginning of a sharp increase in a load to displacement ratio; and defining the displacement from the initial height to the beginning of the sharp increase in the load to displacement ratio as the feature non-deformed displacement distance.

* * * * *